United States Patent [19]

Lee

[11] Patent Number: 4,878,682
[45] Date of Patent: Nov. 7, 1989

[54] CENTER COLLAPSIBLE TRANSPORT CART

[76] Inventor: David M. Lee, 4800 W. McFadden, #93, Santa Ana, Calif. 92704

[21] Appl. No.: 222,958

[22] Filed: Jul. 22, 1988

[51] Int. Cl.[4] ............................................. B62B 11/00
[52] U.S. Cl. ..................................... 280/42; 211/195; 220/6; 280/651
[58] Field of Search .................... 280/35, 42, 639, 651, 280/652, 656, 87.01; 220/6, 7; 211/181, 195, 198, 209

[56] References Cited

U.S. PATENT DOCUMENTS

| | | |
|---|---|---|
| 781,243 | 1/1905 | Thompson . |
| 919,880 | 4/1909 | Kaufmann et al. . |
| 1,820,466 | 8/1931 | Lieblein ................................ 280/42 |
| 1,828,684 | 10/1931 | Scarlett . |
| 2,200,889 | 5/1940 | Mahr .................................... 280/36 |
| 2,558,909 | 7/1951 | Partiot ................................. 280/37 |
| 2,563,995 | 8/1951 | East ..................................... 280/36 |
| 4,325,731 | 4/1982 | Woychio et al. ................... 280/641 |
| 4,339,141 | 7/1982 | Thiboutot ......................... 280/42 X |
| 4,669,743 | 6/1987 | Tipke .................................. 280/42 |
| 4,768,806 | 9/1988 | Tetreault ............................ 280/656 |

OTHER PUBLICATIONS

Fuller Brush Catalog, Spring '88, pp. 22 and 32.
The Crate and Barrel Spring and Summer 1988 Catalog, p. 26.
Target Add, from L.A. Times, Jul. 3, 1988.
Sporty's Tool Shop Catalog, Jan.-Apr. '86, p. 2.
C&H Buyers Guide, Fall '88, p. C&H 37.

Primary Examiner—Charles A. Marmor
Assistant Examiner—Michael Mar
Attorney, Agent, or Firm—Stetina and Brunda

[57] ABSTRACT

A center collapsible transport cart having at least two floor panels pivotally connected along a longitudinal pivot axis. Side panels and end members may be attached to the outer edges of the floor panel to form a desired cargo bed enclosure. When the cart is in its "operative" configuration the floor panels are horizontally disposed in approximate edge-to-edge juxtaposition. When converted to its "stowed" configuration the floor panels are generally vertically disposed in surface-to-surface juxtaposition, thereby forming a relatively flat collapsed structure. A tow bar handle is also pivotally disposable between the vertically juxtapositioned floor panels when the cart is in its stowed configuration.

6 Claims, 2 Drawing Sheets

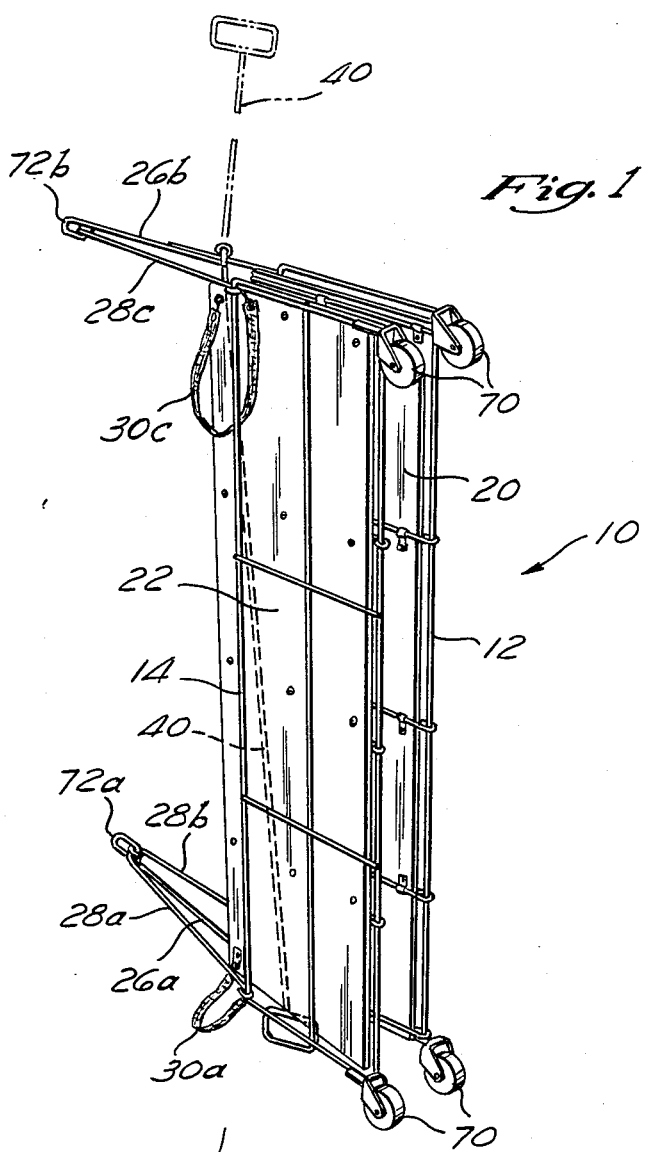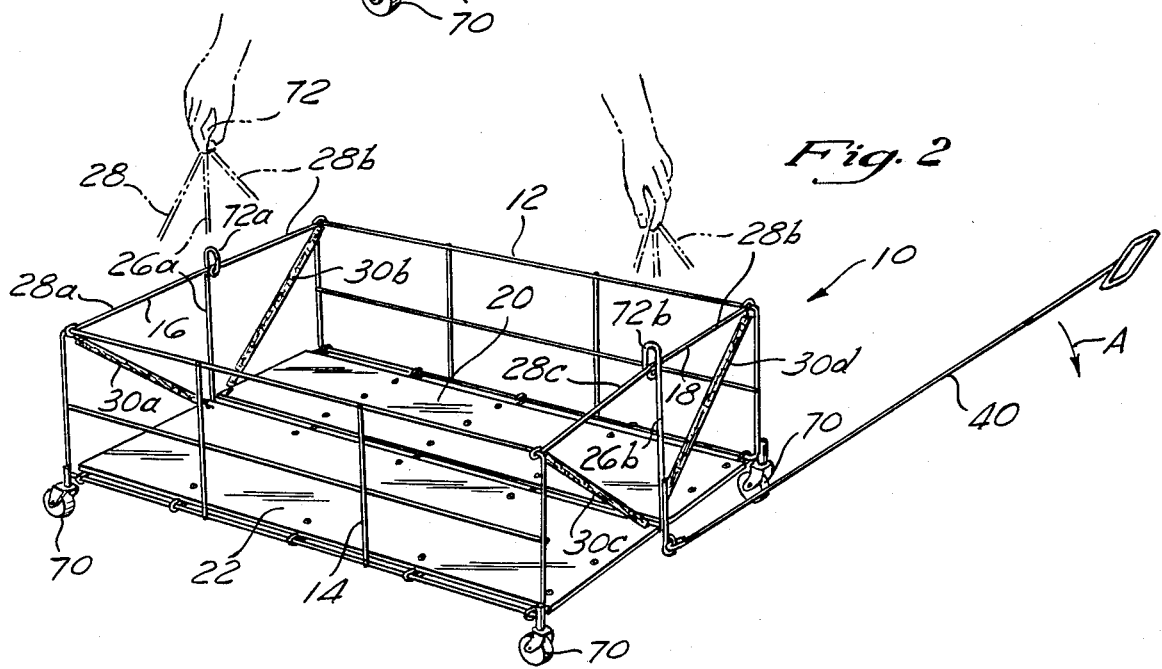

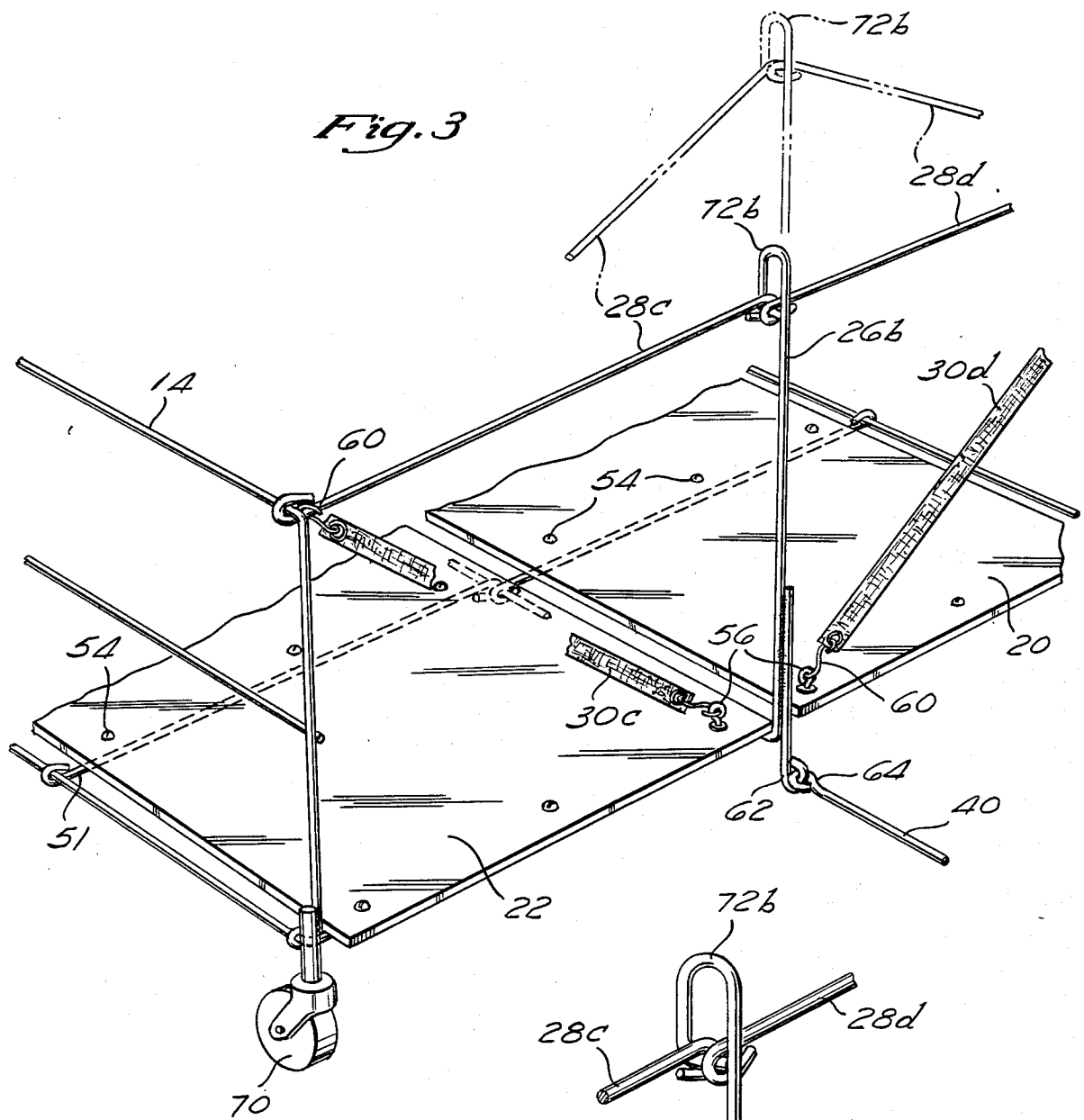
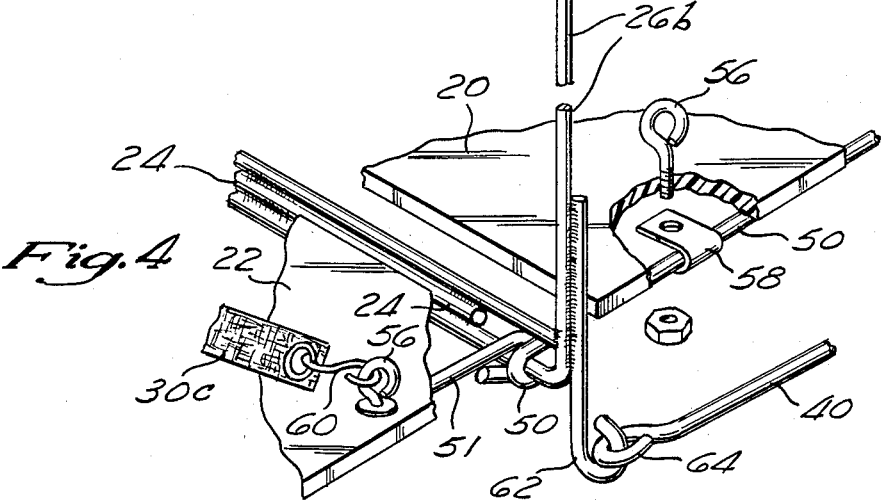

CENTER COLLAPSIBLE TRANSPORT CART

BACKGROUND OF THE INVENTION

This invention relates generally to the art of materials handling, and more particularly to a center collapsible transport cart which is usable in moving miscellaneous items of cargo.

Numerous cart-type devices for transporting various cargos are well known. Such prior art devices include wheelbarrows and various other carts which are designed to be pushed by the user as well as wagons and other types of carts which are designed to be pulled. While some of these prior art transport carts are of collapsible or foldable design, none have provided a truly optimal transport cart capable of being easily converted between an open "operational" configuration wherein the cart may be used to transport various items of cargo and a "stowed" configuration wherein the cart may be stored with in a confined area or hung on a wall.

Some examples of transport carts of the prior art which are capable of folding or collapsing about a central axis are found in U.S. Pat. Nos. 781,242 (Thompson), 919,880 (Kaufman et al.), 1,828,684 (Scarlett), 2,200,889 (Mahr), 2,563,995 (East), and 4,326,731 (Wychio et al.).

BRIEF SUMMARY OF THE INVENTION

In accordance with the present invention there is provided a center collapsible transport cart having at least two separate floor panels. Each floor panel has an inner longitudinal edge and an outer longitudinal edge. The inner longitudinal edges of the separate floor panels are pivotally connected to a common central axis which extends longitudinally along the approximate longitudinal midline of the cart. The cart may thus be disposed in an "operative" configuration wherein said floor panels extend laterally, in opposing directions from the common central axis, thereby lying in approximate edge-to-edge juxtaposition with the upper surfaces thereof forming a generally flat cargo bed floor. Alternately, the cart is disposable in a "stowed" configuration wherein the floor panels are folded or pivoted along the central axis so as to lie in approximate surface-to-surface juxtaposition, thereby forming a generally vertical folded structure suitable for storage or hanging.

In accordance with a further aspect of the invention, one or more side panels may be pivotally connected along the outer longitudinal edges of one or more of the floor panels so as to form side wall enclosures for the cargo bed area when the cart is in its operative configuration.

In accordance with an even further aspect of the invention, at least one vertical member is fixed at either end of the longitudinal pivot axis. When the user lifts upwardly on these vertical members, the operatively disposed cart will convert to its stowed configuration. To wit, as the vertical members are pulled upwardly the longitudinal pivot axis of the cart will move correspondingly in an upward direction. As the pivot axis moves upwardly, the adjacently fixed inner longitudinal edges of the floor panels will correspondingly move upwardly and the outer longitudinal edges thereof will correspondingly move downwardly. As a result, the undersides or lower edges of the floor panels will move into a generally vertical disposition. As such, the vertically disposed floor panels will be in approximate surface-to-surface juxtaposition, thereby bringing the cart into a generally flat folded configuration suitable for storage or hanging. Subsequently, when it is desired to return the cart to its operational configuration, the user may simply pull outwardly on the outer longitudinal edges of the side panels (or any side panels which may be attached thereto) so as to cause the floor panels to pivotally return to their original horizontal dispositions wherein each floor panel extends laterally outward from the central pivot axis When disposed in such horizontal plane, the separate floor panels will preferably form opposite halves of a flat cargo bed floor.

In accordance with still another aspect of the invention, one or more end members may be appropriately connected at either end of the cart. Generally, each such end member will extend between a vertical member which is firmly fixed to the central pivot axis of the cart and one of the laterally positioned outer side walls. As such, the end members will provide stability and support for the outer side walls while, at the same time, allowing sufficient pivotal movement thereof to enable the cart to be easily transformed from its operative to stowed configuration and vice versa.

In accordance with another aspect of the invention, as the floor panels pivot from their vertical (stowed) to their horizontal (operative) dispositions, any attached side panels will remain in generally vertical disposition relative thereto and will move progressively apart as the floor panels unfold or pivot As such, the side panels will be finally positioned perpendicularly along the outer longitudinal edges of the floor panels Thus, the side panels, in cooperation with the floor panels and any appropriately disposed end members will form a desired cargo containment area of the transport cart. A separate handle may be attached to facilitate movement of the cart as desired.

In accordance with a further aspect of the invention, the floor panels of the cart may be formed of rigid sheets of flat material (e.g. plastic, plywood) mounted upon an underlying wire frame The side and end panels of the cart may be of segmental wire or mesh construction so as to be sufficiently rigid to retain any desired cargo within the bed of the cart while being sufficiently light to facilitate movement and portability of the device.

In accordance with a still further aspect of the invention, a handle or tow bar may be pivotally attached to the transport cart such that, when the cart is in its folded or collapsed "stowed" configuration, the handle may be pivotally moved to a position between the vertically juxtapositioned floor panels By moving the handle/tow bar between such vertically juxtapositioned floor panels, it will be held in an out-of-the-way position during storwing or storage of the cart.

In accordance with a still further aspect of the invention, the opposing ends of the cart may comprise singular segments of rigid wire extending between each side wall and a vertical member which extends upwardly from the central pivot axis, at either end of the cart. Each such rigid wire end segment will be pivotally connected at one end to the vertical member and at the other end to the respective laterally disposed side wall. Accordingly, as the user exerts upward lifting force on the vertical member, the individual wire segments will pivot downwardly, following the corresponding movement of the lateral side walls and floor panels as they collapse or fold inwardly to their "stowed" configuration.

A principal object of the invention is to provide a center collapsible transport cart which may be easily converted between a collapsed or folded "stowed" configuration and an open or unfolded "operative" configuration.

A further object of the invention is to provide a center collapsible transport cart of the foregoing character which, when folded into its stowed configuration, may be easily hung on an existing wall or stored in a confined area with no major protrusions extending therefrom.

An even further object of the invention is to provide center collapsible transport cart of the foregoing character which may be economically and reproduceably manufactured.

Further objects and advantages of the invention will become apparent to those skilled in the art upon reading and understanding the following detailed description of a preferred embodiment and the accompanying drawings.

BRIEF DESCRIPTION OF THE DRAWINGS

FIG. 1 is a perspective view of a preferred transport cart of the invention disposed in a stowed configuration and oriented vertically as to be hung on an existing wall;

FIG. 2 is a perspective view of a preferred transport cart of the present invention in its "operative" configuration;

FIG. 3 is an enlarged cutaway perspective view of one end of a preferred transport cart of the present invention; and FIG. 4 is an enlarged cutaway perspective view showing the pivotal center axis and towbar connection assembly of a preferred transport cart of the present invention.

DETAILED DESCRIPTION OF A PREFERRED EMBODIMENT

The following detailed description refers specifically to FIGS. 1 through 4. Such description is intended solely for the purpose of describing and illustrating a presently preferred embodiment of the invention and is not intended to limit the invention in any way.

FIGS. 1 and 2 show a preferred center collapsible transport cart 10 of the invention alternately disposed in a "stowed" configuration (FIG. 1) and an "operative" configuration (FIG. 2). FIGS. 3 and 4 provide more detailed illustrations of the various structural aspects of the presently preferred embodiment in FIGS. 1 and 2.

Generally, as shown in FIG. 1, the center collapsible transport cart 10 may be folded into a flat, fully collapsed "stowed" configuration. Such stowed configuration is sufficiently compact to hang on a garage or basement wall without unsightly or dangerous protrusions extending therefrom. On the other hand, as shown in FIG. 2, when unfolded into its "operative" configuration, the preferred transport cart 10 assumes the shape of a box-like cargo bed having a plurality of under-positioned wheels 70 and a tow bar handle 40 so as to be usable in transporting various items of cargo from place to place.

Basically, the cargo bed of the cart 10 is formed of segmental wire or mesh construction having side wall panels 12 and 14, end members 16 and 18, and bottom panels 20 and 22. Each bottom panel 20, 22 comprises a rigid plastic sheet mounted on an underlying wire support frame. Such bottom panels 20, 22 are pivotally mounted along their inner longitudinal edges, to a longitudinally disposed pivot bar or shaft 24.

Single wire or tubular vertical members 26a, 26b extend perpendicularly upward from either end of the longitudinal pivot bar or shaft 24. The opposing transverse end members 28a, 28b, 28c and 28d of the cart are formed by rigid wire segments which extend between the upper end of each vertical member 26a, 26b and an adjacent lateral side panel 12, 14.

Strap-like flexible struts 30a, 30b, 30c 30d are connected to and extend diagonally between the upper corners of the side panels 12 and 14 and the inner edges of bottom panels 20 and 22, respectively. In addition, the lower or basal edge of each side wall 12, 14 is pivotally connected to the adjacent bottom panel 20 or 22. By such construction, when it is desired to collapse the cart 10, an upward lifting force may be applied to the vertical members 72, as indicated by the phantom lines of FIG. 2. Such exertion of an upward lifting force will cause the center pivot axis 24 to rise. As the rising pivot axis 24 carries with it the pivotally connected inner longitudinal edges of floor panels 20, 22, the outer longitudinal edges of such floor panels 20, 22 will pivot downwardly until they are disposed in a generally vertical, underside-to-underside juxtaposition. Thereafter, or simultaneously therewith, the tow bar 40 may be rotated in the direction indicated by arrow A to assume a stowed position between the now vertically disposed and juxtapositioned bottom panels 20 and 22. Such stowed position of the tow bar 40 is shown by dotted lines in FIG. 1.

When the cart 10 is fully folded into its stowed configuration, the sizing, balance, and configuration of the individual parts is such that the cart 10 will remain in such stowed configuration without requiring any secondary locking devices or tie-around band. In fact, the "stowed" cart 10 may sit directly on its wheels 70 and be rolled about without causing the cart 10 to unfold.

The cart may be converted from its stowed configuration to its operative configuration by moving side panels 12 and 14 outwardly and apart from one another thereby forcing the bottom panels 20, 22 to pivot downwardly while center pivot axis 24 drops to a position running longitudinally down the center of the cargo bed floor, between the connected inner edges of floor panels 20 and 22. By such arrangement, the cart 10 assumes its "operative" configuration as shown in FIG. 2. While in such operative configuration, the flexible diagonal struts 30 will serve to suspend and support the bottom panels 20 and 22, thereby preventing the bottom panels 20, 22 from undergoing further downward pivotal movement beyond the desired horizontally planar positions shown in FIG. 2.

In accordance with the more detailed representations of FIGS. 3 and 4, the bottom panels 20 and 22 comprise flat sections of plastic affixed to a network of underlying wire support members 50, 51 by way of screws 54. Eyebolts 56 are positioned at either end of panels 20 and 22 and adjacent the inner pivot axis 24 so as to provide for attachment of the flexible support struts 30 to the base panels 20 and 22. Eyebolts 56 are passed through apertures within flat plastic panels 20 and 22 and subsequently through brackets 58 which are crimped around underlying wire support members 50. By such arrangement, the eyebolts remain firmly attached to the support structure of the base panels 20 and 22 so as to permit the flexible struts 30a, 30b, 30c 30d to adequantely support and retain the pivotal movement of the base panels 20 and 22.

The upper ends of the flexible strut members 30a, 30c, 30d are connected by way of hooks 60 to the corners formed between end member 28 and side panel 14.

The handle 40 is connected to the cart 10 by way of a connecting member 62 which is welded to one of the vertical members 26 at one end of the cart. The base of the attachment member 62 is looped through an eye 64 formed at the base of handle 40 thereby rendering handle 40 easily pivotal in upward and downward directions. This connection permits the handle 40 to be easily disposed between the undersides of the parallelly stowed base panels 20 and 22 as described above.

Individual wheels in the form of casters 70 are pivotally mounted and extend downwardly from the corners of the cart 10 such that, when the cart is operatively disposed it may be freely rolled upon an underlying, generally flat surface.

Operation of the Preferred Embodiment

As will be appreciated from the drawings, the center collapsible transport cart 10 of the present invention, when in its operative configuration, may be freely wheeled on an underlying horizontal surface. Generally, the tow bar 40 will be utilized to pull the cart in the desired direction. The open configuration of the operatively disposed cart 10 is such that various items of cargo may be easily placed within the inner confines or cargo bed of the cart 10 so as to rest on the floor panels 20 and 22.

After the cargo has been removed from the cart, the cart may be folded into its stowed configuration by grasping the upper terminal portions 72 of upright members 26 and pulling upwardly thereon. Such will cause the center pivot axis 24 to rise correspondingly from its operative lower position to a raised upper position. The inner edges of floor panels 20 and 22 will thus rise while the outer edges thereof will pivot downwardly and inwardly to a point where the cart has become collapsed into a flat configuration in which the undersides of floor panels 20 and 22 are juxtapositioned against one another and the cart body is generally flattened. The handle 40 may then be pivoted downwardly in the direction of arrow A and stowed between the undersides of floor panels 20 and 22 to form a fully stowed transport cart suitable for hanging on a wall hook.

Subsequently, when it is again desired to use the cart, the castors 70 may be placed on the ground or other generally flat surface and the side panels 12 and 14 may be pulled laterally outward in opposing directions so as to cause the cart to return to its unfolded operational configuration. Thereafter, the cart may be used for its intended hauling and cargo carrying functions.

Although the center collapsible transport cart of the invention has been described herein with respect to a presently preferred embodiment, it should be appreciated that various modifications and alterations may be made without departing from the spirit and scope of the invention. For example, although the preferred embodiment is herein shown to be of segmental wire construction, it should be appreciated that various other types of construction including molded plastic, wood, or fabricated metal may be employed. Also, while the floor panels described in the presently preferred embodiment are formed of flat plastic panels disposed upon an underlying wire frame, such floor panels may alternatively be formed of various one-piece molded or fabricated structures capable of achieving the same function as the above-described flat plastic panels with underlying wire frame.

Accordingly, it is intended that all such modifications and alterations be included within the scope of the following claims and the equivalents thereof.

What is claimed is:

1. A collapsible transport, movable between an "operative" configuration and a "stowed" configuration, said transport cart comprising:

a horizontally disposed pivot member having first and second longitudinally spaced ends, said pivot member being movable up and down in a vertical plane so as to be alternately positionable in a lowered position and a raised position;

first and second rigid vertical members connected to and extending upwardly from said first and second longitudinally spaced ends of said pivot member, said first and second vertical members having upper ends which are sized and configured to be grasped and lifted upwardly to cause said upward movement of said pivot member from its lowered position to its raised position;

first and second rectangular floor panels having inner and outer edges;

first and second side walls having upper and lower edges;

a plurality of rigid transverse end members, each said end member being pivotally attached to and extending between an upper end of one of said first and second vertical members and an upper edge of one of said first and second side walls;

at least one flexible strut member attached to and extending between the approximate upper edge of each of said first and second side walls and the approximate inner edge of each of said first and second floor panels, respectively; and a plurality of wheels attached to said transport cart and extending beneath said floor panels for supporting said cart on an underlying surface and for maintaining rolling contact with said underlying surface as the cart is moved between its "stowed" and "operative" configurations;

said transport cart, when in its "operative" configuration being disposed such that:

said pivot member is in its lowered position;

said first and second floor panels extend laterally outward from said pivot member in a common horizontal plane so as to form a generally flat cargo floor;

said first and second side walls extend vertically upward from the outer edges of the horizontally disposed floor panels;

said rigid end members extend laterally from each said vertical member to each said side wall so as to support said side walls and to prevent inadvertent pivotal movement of said side walls relative to said floor panels; and said flexible strut members are fully extended and diagonally taut between each said side wall and each said floor panel so as to support said floor panels in their horizontal operative positions; and said transport cart, when in its "stowed" configuration, being disposed such that:

said pivot member is in its raised position;

said floor panels extend generally downward from the raised pivot member such that said floor members are disposed in generally vertical, side-by-side planes;

said side walls are positioned outboard of and next to said generally vertically disposed floor panels; and said flexible strut members are relaxed and permitted to hang loosely from their points of affixation to said vertical members and said side walls.

2. The transport cart of claim 1 wherein the upper ends of said first and second vertical members comprise handles.

3. The transport cart of claim 1 wherein said plurality of wheels comprise four wheels mounted at separate positions on said transport cart.

4. The transport cart of claim 1 further comprising a tow bar, said tow bar having a proximal end and a distal end, the proximal end thereof being pivotally connected to said cart.

5. The transport cart of claim 4 further comprising a handle formed on the distal end of said tow bar to permit said tow bar to be grasped and manipulated by the human hand.

6. The transport cart of claim 4 wherein said tow bar is pivotally connected to said transport cart in such manner as to be alternately disposable in (a) a first position extending generally away from the transport cart when the cart is in its "operative" configuration and (b) a second position wherein said tow bar is positioned between the generally vertically disposed floor panels of the transport cart when the cart is in its "stowed" configuration.

* * * * *